Mar. 27, 1923.
C. J. WESTERGAARD.
CHURN DRIVING MECHANISM.
FILED JUNE 30, 1921.
1,449,474.
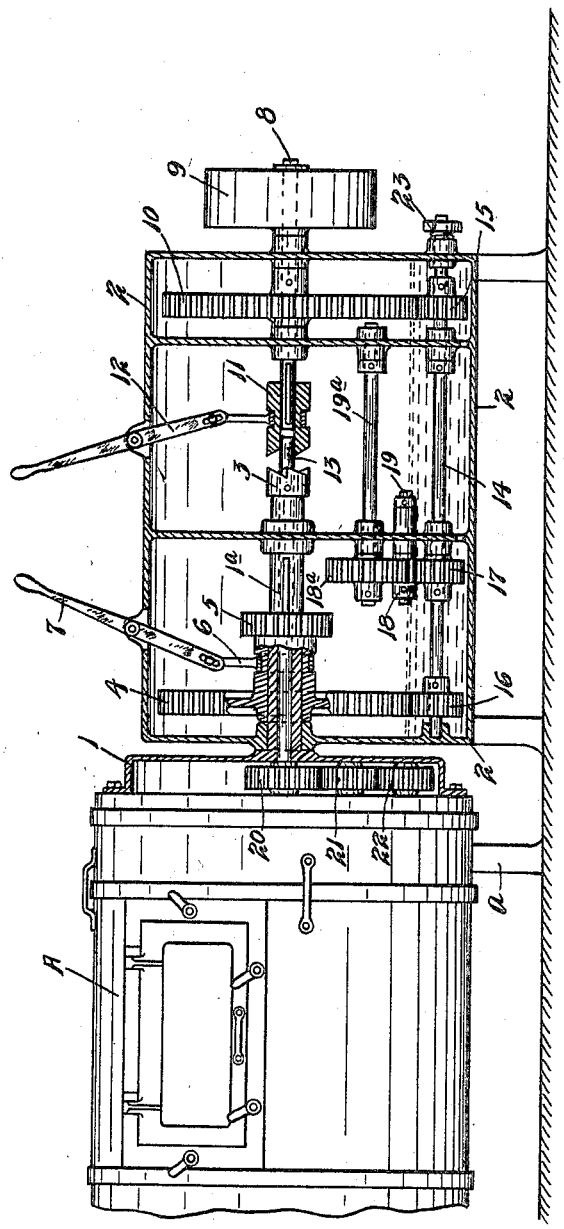
INVENTOR.
CARL J. WESTERGAARD
BY HIS ATTORNEY.
James F. Williamson Patented Mar. 27, 1923.

1,449,474

UNITED STATES PATENT OFFICE.

CARL J. WESTERGAARD, OF MINNEAPOLIS, MINNESOTA.

CHURN-DRIVING MECHANISM.

Application filed June 30, 1921. Serial No. 481,690.

*To all whom it may concern:*

Be it known that I, CARL J. WESTERGAARD, a subject of the King of Denmark, but have taken out my first papers to become a citizen of the United States, residing at Minneapolis, in the county of Hennepin and State of Minnesota, have invented certain new and useful Improvements in Churn-Driving Mechanism; and I do hereby declare the following to be a full, clear, and exact description of the invention, such as will enable others skilled in the art to which it appertains to make and use the same.

This invention relates to a driving and transmission mechanism particularly adapted for driving a churn. Churns of the larger type used in creameries usually have the casing or shell thereof rotated and are provided with longitudinal interior rolls for working the butter, which rolls are also driven or rotated at certain times.

It is an object of this invention to provide an enclosed driving and transmission mechanism arranged to drive the churn at various speeds and also arranged to drive one or more of the churn rolls.

It is a further object of the invention to provide a driving mechanism, substantially all parts of which are enclosed in a casing as a unit and are thus separate from the churn proper.

This and further objects and advantages of the invention will be fully set forth in the following description made in connection with the accompanying drawing, which shows in side elevation a portion of the churn and the driving mechanism therefor, certain parts thereof being shown in section.

Referring to the drawings:

A churn A of cylindrical type is shown which is supported for rotation in the supports *a*. An open ended shell 1 preferably of cylindrical shape is provided with outwardly projecting flanges adapted to be bolted to the end of the churn body. The shell 1 has the projecting sleeve 1ª which is journaled in a bearing formed at one end of a casing 2 and extends through another bearing formed on a partition of said casing. A shaft 13 is journaled in the sleeve 1ª and the member 3 forming one member of a half clutch is secured to said shaft adjacent one end of sleeve 1ª. The said sleeve has secured thereto adjacent the bearing at one end of the casing a large gear 4 having an extended hub portion on the end of which is secured another gear 5. The hub of the gear 4 is grooved to receive a clutch fork 6 engaged by the slotted end of the lever 7 pivoted at the top of the casing 2 and having its handle portion projecting thereabove. The gears 4 and 5 with their connecting hub are splined to the sleeve 1ª and adapted to slide thereon. A shaft 8 is journaled in bearings formed on the outer end of the casing 2 and on an intermediate partition thereof and carries outwardly of said casing a pulley 9. A large gear 10 is secured to the shaft 8 and said shaft is in axial alinement with sleeve 1ª. A member 11 is splined to the shaft 8 for sliding movement thereon and has one end formed as a half clutch adapted to engage with and turn member 3 is further provided with a groove to receive a clutch fork which is connected to the slotted end of a lever 12 intermediately pivoted in the upper side of casing 2 and having its handle portion projecting thereabove.

An auxiliary shaft 14 extends longitudinally of the casing 2 in the lower portion thereof being journaled in bearings formed in the ends and partitions of said casing and said shaft has secured thereto a comparatively small gear 15 in alinement with and adapted to mesh with the gear 10. The gear 16 is secured near the other end of shaft 14 in alinement with and adapted to mesh with the gear 4. The shaft 14 has also secured thereto adjacent one of its intermediate bearings the gear 17 arranged to mesh with a gear 18 carried on one end of a second auxiliary shaft 19, journaled in a bearing formed on one of the partitions of casing 2 and gear 18 meshes with a gear 18ª secured to another auxiliary shaft 19ª also journaled in bearings formed on the partitions of casing 2. The shaft 13 terminates adjacent the end of the shaft at its inner end and its outer end projects into the shell 1 and has secured thereto a gear 20 arranged to mesh with other gears 21 and 22, one or more of which may be connected to the ends of the rolls in the churn. The casing 2 is adapted to contain a quantity of oil and suitable filling and drain connections will be attached thereto. The plug 23 is shown closing the end of the bearing for the shaft 14 at one end of the casing.

The operation of the device is a follows: With the gears in the position shown when power is applied to the pulley 9 by a suitable belt connection, gear 10 will be turned through the gears 15 and 16 and will drive the sleeve 1ª. The shell 1 will thus be turned and the churn will be rotated. In the embodiment of the invention illustrated, the gears are so proportioned that the churn will turn at substantially the same speed as the pulley 9, although the gears may be otherwise proportioned. This gearing forms the high speed drive. If the lever 7 now be swung, the gear 5 will be brought into mesh with the gear 18 and the gear 4 will move out of mesh with gear 16. Power will then be applied to the sleeve through gears 10, 15, 17, 18 and 5 so that shell 1 and churn will be driven at much lower speed. If it is desired to turn the rolls of the churn, the lever 12 will be swung connecting the members 3 and 11 and thus connecting shafts 8 and 13. The gear 20 which may be connected to a roll will now be rotated and one or more rolls will be turned through gears 21 and 22. It will be noted that the driving gears are all enclosed in either the casing 2 or the shell 1. The shell 1 can be easily disconnected from the churn if desired and the casing 2 with the driving mechanism be removed. The gear 20 will be removed with the casing 2, while the gears 20, 21 and 22 will remain on the churn.

From the above description it is seen that applicant has provided a simple, and efficient driving mechanism for a churn, the gears of which are enclosed and the grease and dirt thereon thus kept out of the dairy room and from getting into the milk treating apparatus. The mechanism is easily moved as a whole and can be transported readily to be connected to different churns if desired.

It will, of course, be understood that various changes may be made in the form, details and arrangement of the device without departing from the scope of applicant's invention, which generally stated consists in the matter shown and described and set forth in the appended claims.

What is claimed is:—

1. A driving and transmission mechanism for a churn comprising a casing, a sleeve journaled therein and having at one end an open ended shell adapted to be attached to the churn, a driving shaft journaled in said casing at one end of and in axial alinement with said sleeve, an auxiliary shaft parallel to said shaft, a gear on said driving shaft meshing with a gear on said auxiliary shaft, a gear on said auxiliary shaft meshing with a gear on said sleeve. means for rotating said driving shaft, a shaft journaled in said sleeve, a gear secured to one end thereof and disposed in said open-ended shell and adapted to turn a churn roll, and means for connecting and disconnecting said shaft from the driving shaft.

2. A driving and transmission mechanism for a churn, comprising a closed casing and sleeve journaled in said casing and having at one end thereof outwardly of said casing an open-ended shell adapted to be attached to a churn, a large and a small gear splined to said sleeve and slidable as a unit thereon in said casing in axial alinement with said sleeve, a driving shaft journaled in said casing and auxiliary shafts carrying gears arranged to be driven at different speeds with which the said gears on said sleeve are arranged to alternately mesh and means for coupling said driving shaft to said sleeve.

3. The structure set forth in claim 3, a shaft journaled in said sleeve and having a gear on the end thereof disposed in said shell and having its other end terminating adjacent the end of the driving shaft in said casing and a clutch movable on said shaft for connecting and disconnecting the same to the driving shaft.

4. The structure set forth in claim 4, a lever pivoted to said casing having its handle portion projecting above the same for moving the said gears on sleeve and another lever pivoted to said casing and projecting above the same for operating said clutch.

5. A driving and transmission mechanism for a churn comprising a casing and sleeve journaled therein and having a member at one end thereof outward of said casing adapted to be connected to a churn, a driving shaft journaled in said casing, a high speed train of gears in said casing for driving said sleeve, a low speed train of gears in said casing for driving said sleeve, a shaft journaled in said sleeve and provided with means for driving the churn rolls and means for connecting and disconnecting the same from said driving shaft.

In testimony whereof I affix my signature.

CARL J. WESTERGAARD.